United States Patent
DeFelice et al.

(10) Patent No.: US 9,611,941 B1
(45) Date of Patent: Apr. 4, 2017

(54) BLIND RETAINING RING FOR VALVE PISTON

(71) Applicant: Hamilton Sundstrand Corporation, Windsor Locks, CT (US)

(72) Inventors: Robert DeFelice, Wethersfield, CT (US); Josh Kamp, Glastonbury, CT (US); Donald E. Army, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 2 days.

(21) Appl. No.: 14/923,582

(22) Filed: Oct. 27, 2015

(51) Int. Cl.
*F16K 3/26* (2006.01)
*B64D 13/06* (2006.01)
*F16K 1/34* (2006.01)

(52) U.S. Cl.
CPC .............. *F16K 3/267* (2013.01); *B64D 13/06* (2013.01); *F16K 1/34* (2013.01); *B64D 2013/0603* (2013.01)

(58) Field of Classification Search
CPC ... F16K 3/267; F16K 3/26; F16K 1/32; F16K 1/34; B64D 13/06; B64D 2013/0603
USPC ......................................... 251/324–325, 356
See application file for complete search history.

(56) References Cited

U.S. PATENT DOCUMENTS

| | | | | |
|---|---|---|---|---|
| 2,306,800 A | * | 12/1942 | Caldwell | F16J 15/3268 277/437 |
| 2,933,285 A | * | 4/1960 | Tucker | F16K 41/04 251/324 |
| 3,290,002 A | * | 12/1966 | Self | F16K 1/54 251/332 |
| 4,240,654 A | | 12/1980 | Gladieux | |
| 5,146,945 A | * | 9/1992 | La Rosa | F16K 41/02 251/324 |
| 5,845,944 A | | 12/1998 | Enger et al. | |
| 7,631,905 B2 | | 12/2009 | McGee et al. | |
| 8,439,070 B2 | | 5/2013 | McAuliffe et al. | |
| 2013/0248741 A1 | * | 9/2013 | McAuliffe | F16K 3/26 251/62 |

FOREIGN PATENT DOCUMENTS

CA        2201221       10/1997

* cited by examiner

*Primary Examiner* — John Bastianelli
(74) *Attorney, Agent, or Firm* — Kinney & Lange, P.A.

(57) ABSTRACT

A piston includes a main body extending between a first end and a second end along a center axis of the piston. The main body further includes a chamber formed within the main body, the chamber having an opening disposed at the first end of the main body. The piston also includes a cap, the cap being coaxial with the main body. A portion of the cap extends into the opening of the chamber of the main body. At least one of the main body and the cap includes a radially extending lip, and the other of the main body and the cap includes a groove. A retaining ring is both disposed partially in the groove and in contact with the radially extending lip so as to connect the cap to the main body.

14 Claims, 4 Drawing Sheets

BLIND RETAINING RING FOR VALVE PISTON

BACKGROUND

This disclosure is directed generally to bypass valves for use in an aircraft environmental control system, and more specifically to pistons used in the bypass valves.

An environmental control system aboard an aircraft directs a portion of airflow for use in cabin air conditioning. A typical environmental control system will include bypass valves and temperature control valves to condition and control the airflow. Airflow bypassed for use in the cabin air conditioning systems can include particulate contaminates that can adversely affect bypass valve operation. Moreover, air bypassed into the air conditioning systems may include water that enters the bypass valve. Water and accumulated contaminates within the bypass valve can cause undesired operation of the bypass valve.

Furthermore, variations in temperature can induce stress in the components of the bypass valve, such as the piston. If the piston includes multiple parts, the variations in temperature experienced by the piston can cause thermally induced stresses in the joints and connections of the multiple parts of the piston. Over time, these thermally induced stress can cause the joints and connections of the multiple parts of the piston to fail.

SUMMARY

In one aspect of the invention, a piston includes a main body extending between a first end and a second end along a center axis of the piston. The main body further includes a chamber formed within the main body, the chamber having an opening disposed at the first end of the main body. The piston also includes a cap, the cap being coaxial with the main body. A portion of the cap extends into the opening of the chamber of the main body. At least one of the main body and the cap includes a radially extending lip, and the other of the main body and the cap includes a groove. A retaining ring is both disposed partially in the groove and in contact with the radially extending lip so as to connect the cap to the main body.

In another aspect of the invention, a piston includes a main body extending between a first end and a second end along a center axis of the piston. The main body further includes an opening disposed at the first end of the main body. A radially inward facing surface is disposed around the opening and extends from the first end of the main body to a lip. The lip extends radially outward from radially inward facing surface of the main body. At least a portion of the radially inward facing surface is angled such that the radially inward facing surface tapers radially inward as the radially inward facing surface extends from the first end to the lip. A cap is coaxial with the main body and includes a radially outward facing surface that is smaller in diameter than the radially inward facing surface of the main body. The cap further includes a stop surface extending outward from the radially outward facing surface of the cap. The stop surface is larger in diameter than the radially inward facing surface of the main body. A groove is formed in the radially outward facing surface. The radially outward facing surface of the cap is positioned opposite the radially inward facing surface of the main body and the stop surface is disposed proximate the first end of the main body. A retaining ring is disposed partially in the groove of the cap and in contact with the lip of the main body.

In another aspect of the invention, a piston includes a main body extending between a first end and a second end along a center axis of the piston. The main body further includes a chamber formed within the main body, the chamber having an opening disposed at the first end of the main body. The piston further includes a cap that is coaxial with the main body. A portion of the cap extends into the opening of the chamber of the main body. The cap includes a radially outward extending lip, and the main body comprises a groove. A retaining ring is both disposed partially in the groove of the main body and in contact with the radially outward extending lip so as to connect the cap to the main body.

Persons of ordinary skill in the art will recognize that other aspects and embodiments of the present invention are possible in view of the entirety of the present disclosure, including the accompanying figures.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The present disclosure provides a piston for a bypass valve assembly used in aircraft environmental control systems. The piston includes a main body and cap that together form a tortuous path that settles out particle matter and moisture carried by the airflow. To increase operational life of the piston, the main body and the cap are connected together by a blind retaining ring arrangement. The blind retaining ring arrangement provides a longer lasting connection between the cap and main body of the piston than previous designs because the blind retaining ring arrangement allows the main body to thermally fluctuate in size independent of the cap, and vice versa. Some exemplary embodiments of the piston are discussed below with reference to the figures.

Figure 1:
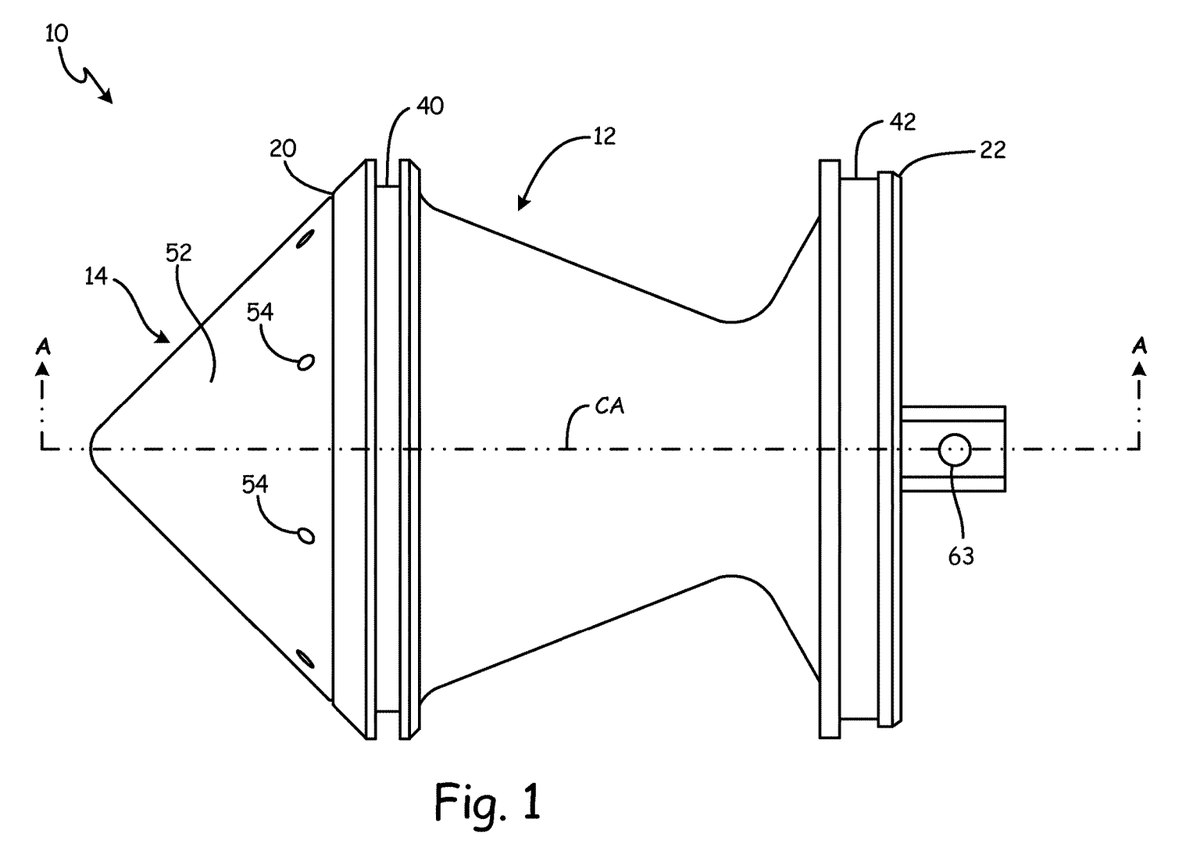
FIG. 1 is an elevation view of piston for a bypass valve.
Figure 2:
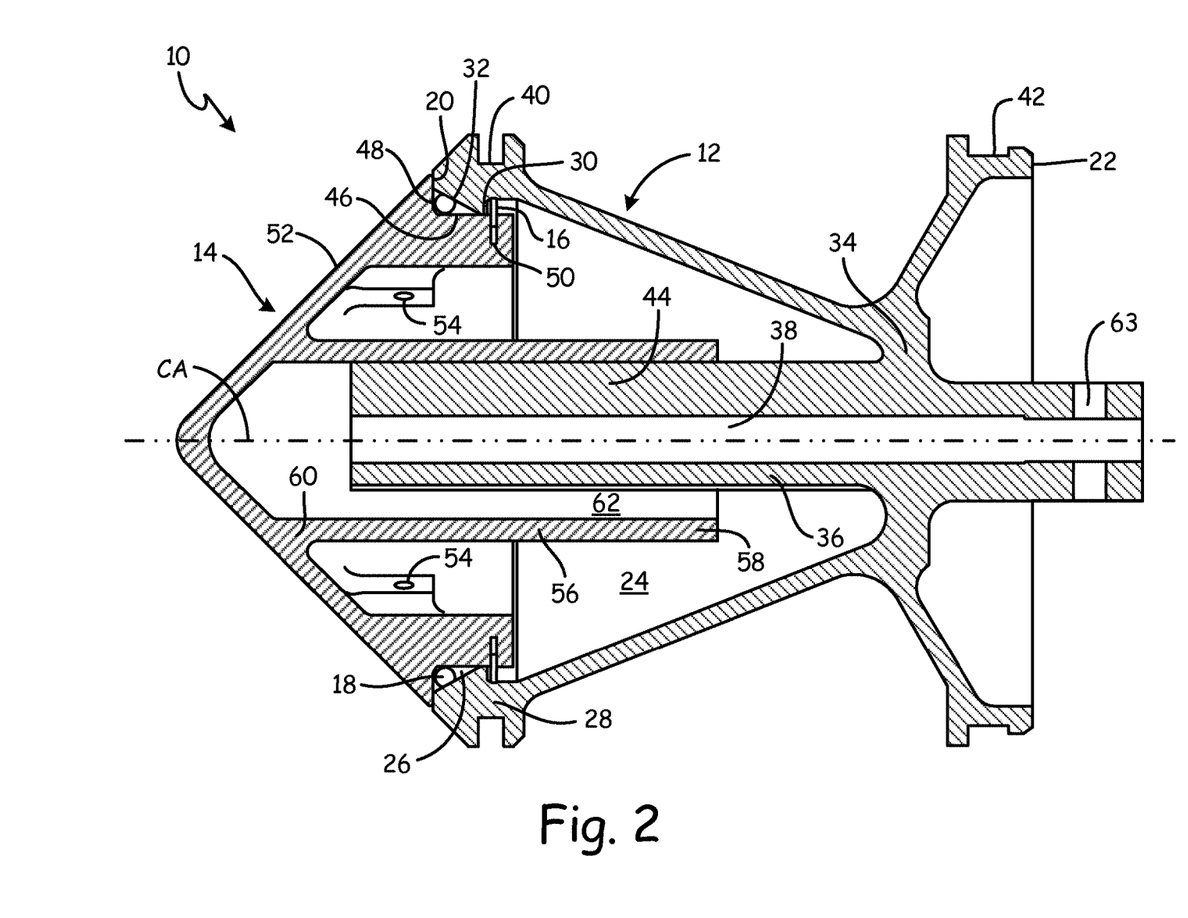
FIG. 2 is a cross-sectional view of the piston from FIG. 1 taken along line A-A.
Figure 3:
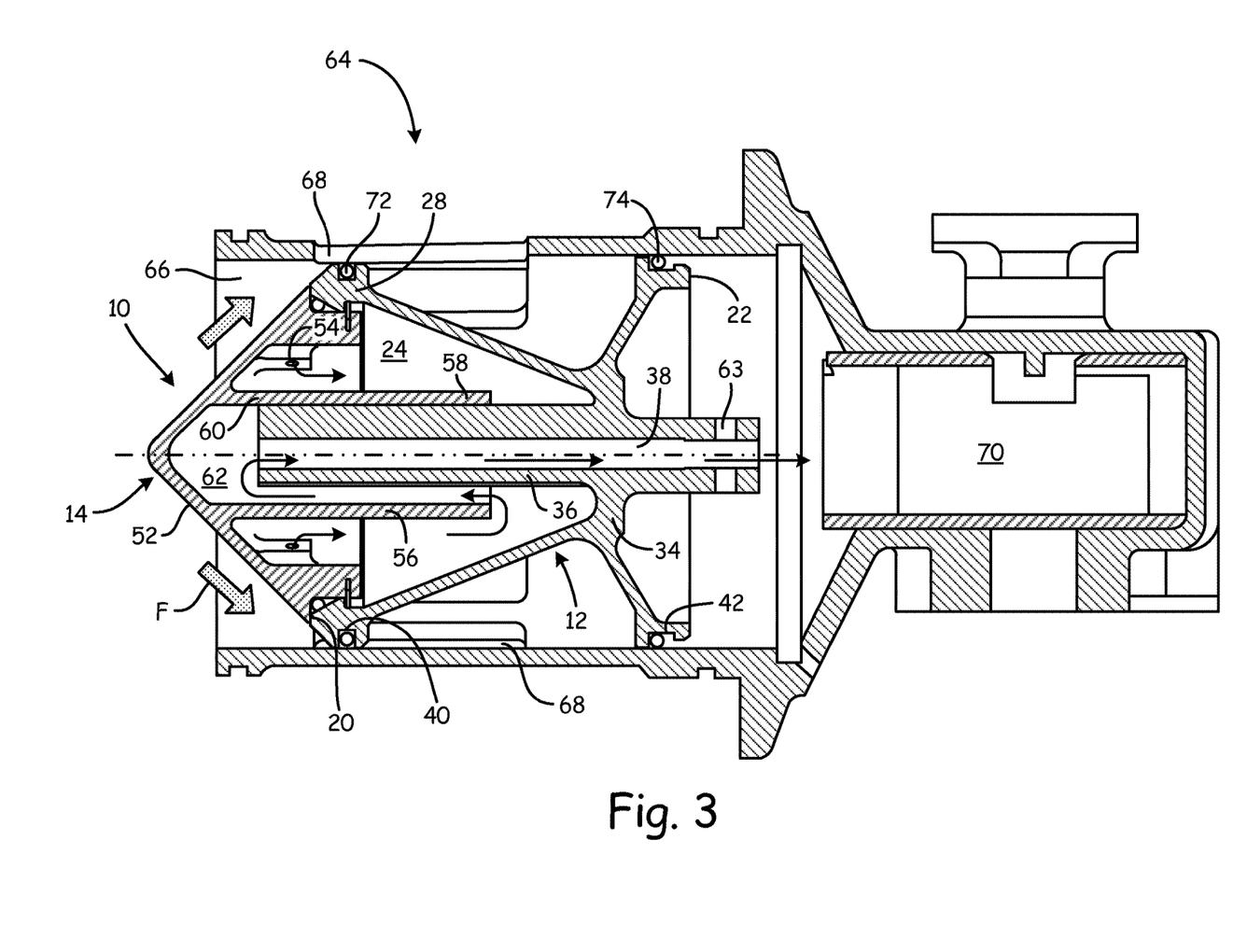
FIG. 3 is a cross-sectional view of the piston of FIG. 2 in a bypass valve.

FIGS. 1-3 will be discussed concurrently. FIG. 1 is an elevation view of piston 10 for a bypass valve. FIG. 2 is a cross-sectional view of piston 10 from FIG. 1 taken along line A-A. FIG. 3 is a cross-sectional view of piston 10 in bypass valve assembly 64. As shown in FIGS. 1-3, piston 10 can include center axis CA, main body 12, cap 14, retaining ring 16, and seal 18. As best shown in FIG. 2, main body 12 can include first end 20, second end 22, chamber 24 with opening 26, rim 28, lip 30, radially inward facing surface 32, intermediate wall 34, column 36, exit passage 38, first seal groove 40, and second seal groove 42. Column 36 of main body 12 can include ribs 44 (only one of which is shown in FIG. 2). Cap 14 of piston 10 can include radially outward facing surface 46, stop surface 48, groove 50, conical surface 52, inlet holes 54, and tube 56 with first end 58 and second end 60. Piston 10 can also include flow passage 62. Bypass valve assembly 64 can include bore 66, outlets 68, back chamber 70, first seal 72, and second seal 74.

Main body 12 of piston 10 extends between first end 20 and second end 22 of main body 12 along center axis CA of piston 10. Chamber 24 is an open cavity that can be formed within main body 12. As described in greater detail below with reference to FIGS. 2 and 3, chamber 24 can be used by piston 10 as a settling chamber for collecting particle matter and moisture droplets carried by an airflow passing through piston 10. Intermediate wall 34 can be disposed between chamber 24 and second end 22 of main body 12 to close off chamber 24 to second end 22 of main body 12. Opening 26 of chamber 24 can be disposed at first end 20 of main body 12 to allow access into chamber 24 at first end 20. Rim 28 of main body 12 is formed around opening 26 and can be radially thicker than the portions of main body 12 that extend between rim 28 and intermediate wall 34 so as to accommodate lip 30 and radially inward facing surface 32.

As shown in FIG. 2, lip 30 can be axially positioned on rim 28 between first end 20 and second end 22 of main body 12, and can extend radially inward from rim 28 of main body 12 into chamber 24. Radially inward facing surface 32 can be formed on rim 28 axially between first end 20 of main body 12 and lip 30. Radially inward facing surface 32 can be disposed around opening 26 so as to define opening 26. Radially inward facing surface 32 can extend from first end 20 of main body 12 to lip 30. At least a portion of radially inward facing surface 32 is angled such that radially inward facing surface 32 tapers radially inward as the radially inward facing surface 32 extends from first end 20 to lip 30. Aft of radially inward facing surface 32, aft being defined as the direction moving from first end 20 to second end 22, lip 30 can extend radially outward from radially inward facing surface 32 to create a radially outward set-back relative radially inward facing surface 32 to accommodate retaining ring 16 when cap 14 is connected to main body 12.

Cap 14 is connected to first end 20 of main body 12. When cap 14 is connected to main body 12, cap 14 is coaxial with main body 12 and, as shown in FIG. 2, the portion of cap 14 that includes radially outward facing surface 46 can be inserted into opening 26 of chamber 24 of main body 12. Radially outward facing surface 46 of cap 14 is smaller in diameter than radially inward facing surface 32 of main body 12 so that radially outward facing surface 46 of cap 14 can extend into opening 26 of chamber 24. Once inserted into opening 26 of chamber 24, at least a portion of radially outward facing surface 46 of cap 14 can be positioned opposite radially inward facing surface 32 of main body 12.

Stop surface 48 of cap 14 can extend radially outward from radially outward facing surface 46 of cap 14 and is larger in diameter than radially inward facing surface 32 of main body 12. When cap 14 is connected to main body 12, stop surface 48 is disposed outside of opening 26 of main body 12 and is disposed proximate first end 20 of main body 12. Stop surface 48 serves as one means of limiting the axial movement of cap 14 in the direction of the second end 22 of the main body 12. Furthermore, because stop surface 48 is larger in diameter than radially inward facing surface 32 and opening 26 of main body 12, cap 14 covers opening 26 of main body 12.

Groove 50 can be formed in radially outward facing surface 46 of cap 14. Groove 50 can be annular, thus extending the full circumference of radially outward facing surface 46 of cap 14. Retaining ring 16 is disposed at least partially in groove 50 of cap 14. In one embodiment, retaining ring 16 can be an external circlip formed from a resilient material, such as but not limited to stainless spring steel. Retaining ring 16 can be wound from rectangular stock, so that retaining ring 16 includes a generally rectangular cross-sectional profile that is smaller in the axial direction than in the radial direction. In other embodiments, retaining ring 16 can include perforations or cutouts to reduce the overall weight of piston 10 and improve the overall fuel efficiency of the aircraft incorporating piston 10. In other embodiments, retaining ring 16 can be a non-stamped spring wire circlip. Retaining ring 16 can include an inner diameter disposed in groove 50 and that is smaller in diameter than radially outward facing surface 46 of cap 14. Retaining ring 16 can include an outer diameter disposed outside of groove 50 and that is larger in diameter than radially inward facing surface 32 of main body 12 when retaining ring 16 is in a non-compressed state.

Retaining ring 16 can be placed in groove 50 of cap 14 before cap 14 is connected to main body 12. When cap 14 is connected to main body 12, radially outward facing surface 46 is inserted into opening 26 of main body 12. As radially outward facing surface 46 is moving axially into opening 26, retaining ring 16 contacts the angled/tapered portion of radially inward facing surface 32 of main body 12. As cap 14 continues to move axially toward main body 12, the retaining ring 16 is radially compressed as the retaining ring moves against the angled/tapered portion of radially inward facing surface 32 of main body 12. Retaining ring 16 can include a circumferential gap large enough such that when ends (not shown) of retaining ring 16 touch one another, groove 50 and radially inward facing surface 32 can fully accommodate retaining ring 16 as retaining ring 16 is compressed by radially inward facing surface 32 of main body 12.

Once the retaining ring 16 reaches lip 30, retaining ring 16 decompresses and moves radially outward such that retaining ring 16 is still disposed partially in annular groove 50 but is also in contact with lip 30 of main body 12, thereby locking lip 30 and radially inward facing surface 32 of main body 12 between retaining ring 16 and stop surface 48 of cap 14. With lip 30 and radially inward facing surface 32 of main body 12 locked between retaining ring 16 and stop surface 48 of cap 14, cap 14 is connected onto main body 12. The connection between cap 14 and main body 12 can be relatively permanent since retaining ring 16 cannot be accessed from outside piston 10. The axial distance between retaining ring 16 and stop surface 48 can be slightly larger than the axial length of lip 30 and radially inward facing surface 32, so that cap 14 can move slightly relative main body 12. Seal 18 can be placed between cap 14 and main body 12 so as to reduce the movement between cap 14 and main body 12.

As shown in FIG. 2, seal 18 can be disposed on radially outward facing surface 46 of cap 14 and in contact with both radially inward facing surface 32 of main body 12 and stop surface 48 of cap 14. Seal 18 can be compressed between cap 14 and main body 12 such that seal 18 exerts a load against cap 14 and main body 12. Because seal 18 exerts a load both against cap 14 and against main body 12, seal 18 can reduce movement between cap 14 and main body 12 and thereby dampen cap 14 and main body 12 against vibration that can be caused by the aircraft during operation. Vibration between cap 14 and main body 12 is undesirable as the vibration can cause wear between cap 14 and main body 12.

In one embodiment, seal 18 can be an O-ring seal formed from an elastomeric material, such as rubber. Seal 18 can be placed on cap 14 before cap 14 is connected to main body 12.

Once assembled, piston 10 can be assembled into bypass valve assembly 64, as shown in FIG. 3, During operation, piston 10 is disposed inside bore 66 and is actuated in bore by 66 an actuator (not shown) to partially block outlets 68 of bore 66 and to control an airflow F traveling out of bore 66 through outlets 68. Outlets 68 of bore 66 can be transverse with bore 66. Back chamber 70 can be connected to bore 66 aft of outlets 68 to house the actuator. To help direct the airflow F from bore 66 into outlets 68, conical surface 52 can be formed on cap 14 and can extend axially from stop surface 48 in an axial direction opposite radially outward facing surface 46 of cap 14. As shown in FIGS. 1-3, conical surface 52 can taper radially inward as conical surface 52 extends axially away from stop surface 48. When the airflow F meets conical surface 52 of cap 14, conical surface 52 directs the airflow F radially outward from center axis CA into outlets 68 of bore 66.

A portion of the airflow F can enter piston 10 through cap 14, and can traverse main body 12 to substantially equalize the pressure on each side of piston 10. Equalizing the pressure across piston 10 reduces the amount of force required by the actuator to move piston 10 to a desired position. The portion of airflow F entering piston 10 can enter through cap 14 via inlet holes 54. Inlet holes 54 can be formed in conical surface 52 and can extend through cap 14 to fluidically communicate with opening 26 and chamber 24 of main body 12. To help reduce ingestion of particle matter and/or moisture carried by the airflow F into inlet holes 54, inlet holes 54 can extend through cap 14 orthogonal to center axis CA. Should particle matter and/or moisture enter inlet holes 54, main body 12 and cap 14 together can form a tortuous path inside piston 10 that settles out particle matter and moisture carried by the airflow F before the airflow F reaches second end 22 of main body 12. Preventing particle matter and moisture from reaching second end 22 of main body 12 helps lengthen the service life of the bypass valve by keeping the actuator clean of particle matter and moisture that might bind or corrode the actuator. As shown in FIGS. 2 and 3, tube 56 of cap 14 and column 36 of main body 12 can form the tortuous path inside piston 10.

Tube 56 can extend from cap 14 into opening 26 and chamber 24 of main body 12. First end 58 of tube 56 is disposed inside chamber 24 of main body 12 and second end 60 of tube 56 can be connected to cap 14. Second end 60 of tube 56 can be closed, and first end 58 of tube 56 can be open to receive column 36 of main body 12. Column 36 can extend from intermediate wall 34 of main body 12 into chamber 24 and into tube 56 of cap 14. Column 36 terminates between first end 58 and second end 60 of the tube 56. Exit passage 38 can extend through column 36 and intermediate wall 34 to fluidically connect second end 22 of main body 12 with second end 60 of tube 56. Flow passage 62 can be formed between tube 56 of cap 14 and column 36 of main body 12 to fluidically connect second end 60 of tube 56 and exit passage 38 with chamber 24.

During operation, the portion of airflow F entering piston 10 will take a sharp turn to enter inlet holes 54 of cap 14. After passing through the inlet holes 54, the airflow F will enter chamber 24. Before the airflow F can leave chamber 24 and enter flow passage 62, the airflow F must make a 180° turn. As the airflow F makes the 180° turn to enter flow passage 62, the airflow F will decelerate, causing particle matter and moisture that may still be present in the airflow F to fall and settle inside chamber 24. After passing through flow passage 62, the airflow F will have to make another 180° turn before the airflow F can enter exit passage 38. The 180° turn between flow passage 62 and exit passage 38 can also cause any particle matter and moisture that may still be present in the airflow F to fall out of the airflow F. Once the airflow F enters exit passage 38, the airflow F will travel across exit passage 38 to second end 22 of main body 12, thereby substantially equalizing the pressure at second end 22 of main body 12 with the pressure at conical surface 52 of cap 14.

Column 36 can also extend beyond second end 22 of main body 12 and can include connection hole 63 to be used as a means for connection piston 10 to the actuator. Ribs 44 (only one of which is shown in FIG. 2) can extend radially between column 36 and tube 56 in flow passage 62 to provide support between column 36 and tube 56 against vibration during operation. Reducing vibration in piston 10 reduces the wear on piston 10 that can be caused by vibration. First seal groove 40 can be formed on rim 28 of main body 12 to receive first seal 72 to reduce the likelihood of airflow F and particle matter passing around the outside of piston 10. Second seal groove 42 can be formed in second end 22 of main body 12 to receive second seal 74 to also reduce the likelihood of airflow F and particle matter passing around the outside of piston 10. Main body 12 can taper radially inward from rim 28 to intermediate wall 34 to reduce the surface area of piston 10 that contacts the bore housing piston 10. Tapering main body 12 radially inward from rim 28 to intermediate wall 34 can also aid in directing and turning the airflow F inside chamber 24 into flow passage 62.

Both main body 12 and cap 14 of piston 10 can be formed from a glass filled polyetheretherketone material, such as ASTM D4000 PEEK. Main body 12 and cap 14 can also be formed from any material that can be readily shaped into the relatively sophisticated geometries of main body 12 and cap 14. Piston 10 can also include additional embodiments, such as the additional embodiment disclosed in FIG. 2.

Figure 4:
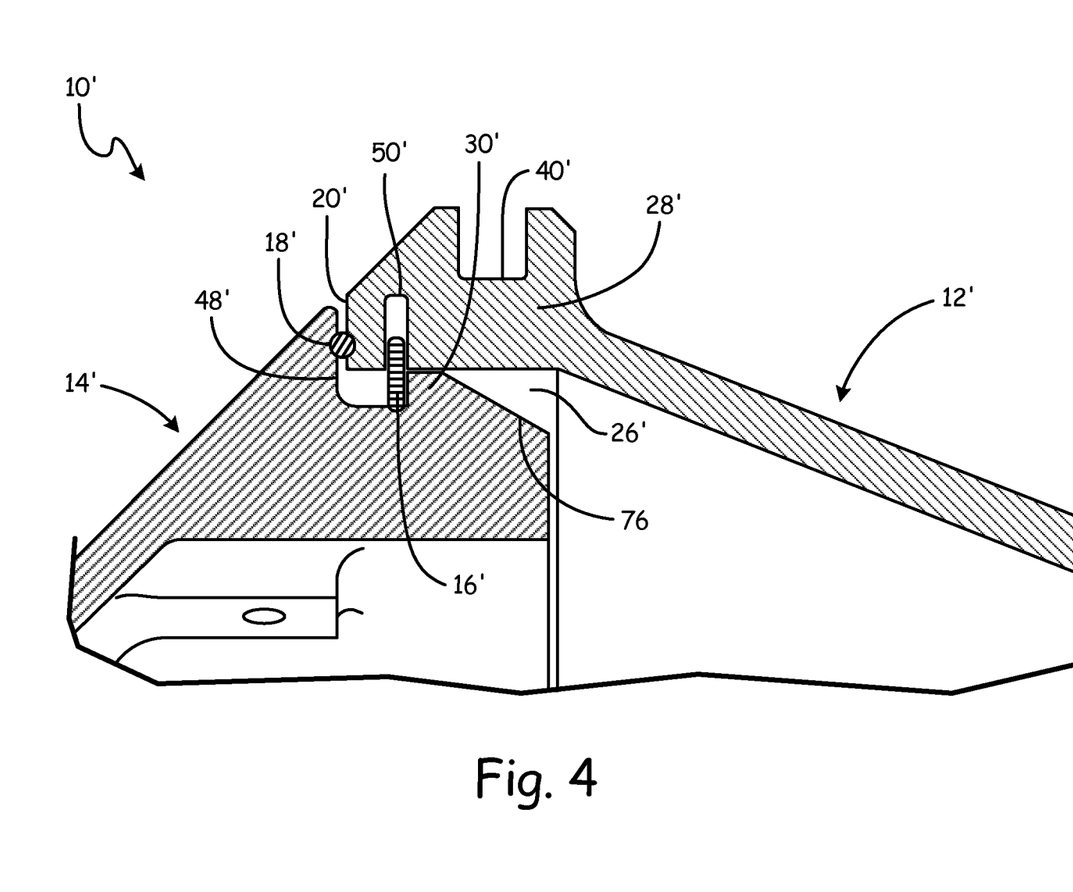
FIG. 4 is a cross-sectional view of another embodiment of a portion of a piston for a bypass valve.

FIG. 4 is a cross-sectional view of a portion of another embodiment of piston 10'. As shown in FIG. 4, groove 50' can be formed on rim 28'. Retaining ring 16' can be partially disposed in groove 50' and can extend radially inward into opening 26' of main body 12'. Cap 14' can include lip 30' and tapered surface 76. In the embodiment of FIG. 4, retaining ring 16' can be an internal circlip formed from a resilient material, such as but not limited to stainless spring steel. Retaining ring 16' can be wound, so that retaining ring 16' includes a generally rectangular cross-sectional profile that is smaller in the axial direction than in the radial direction. In other embodiments, retaining ring 16' can include perforations or cutouts to reduce the overall weight of piston 10' and improve the overall fuel efficiency of the aircraft incorporating piston 10'. In other embodiments, retaining ring 16' can be a non-stamped spring wire circlip. Retaining ring 16' can include an outer diameter disposed in groove 50' and an inner diameter that is smaller than lip 30' and first seal groove 40' when retaining ring 16' is in a non-flexed state.

When cap 14' is connected to main body 12', tapered surface 76 is inserted into opening 26' of main body 12'. Tapered surface 76 expands retaining ring 16' as tapered surface 76 enters opening 26'. When lip 30' of cap 14' reaches and passes retaining ring 16', retaining ring 16' constricts radially inward, thereby locking retaining ring 16' between lip 30' and stop surface 48' of cap 14'. Seal 18' can be disposed between stop surface 48' of cap 14' and first end 20' of main body 12'. Seal 18' can be compressed between cap 14' and main body 12' such that seal 18' exerts a load against cap 14' and main body 12'. Because seal 18' exerts a load both against cap 14' and against main body 12', seal 18' can reduce movement between cap 14' and main body 12' and thereby dampen cap 14' and main body 12' against vibration.

In view of the foregoing description, it will be recognized that the present disclosure provides numerous advantages and benefits. For example, the present disclosure provides piston 10 with main body 12, cap 14, retaining ring 16, and seal 18. Retaining ring 16 connects cap 14 to main body 12 in a manner that allows enough movement between cap 14 and main body 12 so that main body 12 can thermally fluctuate in size independent of cap 14, and vice versa, without degrading the connection between main body 12 and cap 14. Seal 18 provides the additional benefit of damping the vibrations and movement between body 12 and cap 14 so as to reduce the wear between cap 14 and main body 12 during operation.

The following are non-exclusive descriptions of possible embodiments of the present invention.

In one embodiment, a piston includes a main body extending between a first end and a second end along a center axis of the piston. The main body further includes a chamber formed within the main body, the chamber having an opening disposed at the first end of the main body. The piston also includes a cap, the cap being coaxial with the main body. A portion of the cap extends into the opening of the chamber of the main body. At least one of the main body and the cap includes a radially extending lip, and the other of the main body and the cap includes a groove. A retaining ring is both disposed partially in the groove and in contact with the radially extending lip so as to connect the cap to the main body.

The piston of the preceding paragraph can optionally include, additionally and/or alternatively, any one or more of the following features, configurations and/or additional components:

a seal disposed between the cap and the main body, wherein the seal is configured to be compressed between the cap and the main body such that the seal exerts a load against the cap and the main body;

the radially extending lip extends radially inward from the main body toward the cap and wherein the main body further comprises: a radially inward facing surface disposed around the opening, wherein the radially inward facing surface extends from the first end of the main body to the radially extending lip, wherein at least a portion of the radially inward facing surface is angled such that the radially inward facing surface tapers radially inward as the radially inward facing surface extends from the first end to the radially extending lip;

the cap further comprises: a radially outward facing surface that is smaller in diameter than the radially inward facing surface of the main body; a stop surface extending radially outward from the radially outward facing surface of the cap, wherein the stop surface is larger in diameter than the radially inward facing surface of the main body; and the groove is formed in the radially outward facing surface, wherein the radially outward facing surface of the cap is positioned opposite the radially inward facing surface of the main body, and wherein the stop surface is disposed proximate the first end of the main body, and wherein the retaining ring is disposed partially in the groove of the cap and in contact with the radially extending lip of the main body; and/or the retaining ring includes a circumferential gap forming a first end and a second end in the retaining ring, wherein the circumferential gap is of adequate size such that when the first and second ends of the retaining ring touch one another, the retaining ring is able to freely pass through the opening in the first end of the main body of the piston.

In another embodiment, a piston includes a main body extending between a first end and a second end along a center axis of the piston. The main body further includes an opening disposed at the first end of the main body. A radially inward facing surface is disposed around the opening and extends from the first end of the main body to a lip. The lip extends radially outward from radially inward facing surface of the main body. At least a portion of the radially inward facing surface is angled such that the radially inward facing surface tapers radially inward as the radially inward facing surface extends from the first end to the lip. A cap is coaxial with the main body and includes a radially outward facing surface that is smaller in diameter than the radially inward facing surface of the main body. The cap further includes a stop surface extending radially outward from the radially outward facing surface of the cap. The stop surface is larger in diameter than the radially inward facing surface of the main body. A groove is formed in the radially outward facing surface. The radially outward facing surface of the cap is positioned opposite the radially inward facing surface of the main body and the stop surface is disposed proximate the first end of the main body. A retaining ring is disposed partially in the groove of the cap and in contact with the lip of the main body.

The piston of the preceding paragraph can optionally include, additionally and/or alternatively, any one or more of the following features, configurations and/or additional components:

a seal disposed on the radially outward facing surface of the cap and in contact with the radially inward facing surface of the main body and the stop surface of the cap, wherein the seal is configured to be compressed between the cap and main body such that the seal exerts a load against the cap and the main body;

the cap covers the opening of the main body;

the cap further comprises: a conical surface that extends axially from the stop surface in an axial direction opposite the radially outward facing surface of the cap, and wherein the conical surface tapers radially inward as the conical surface extends axially away from the stop surface;

the main body further comprises: a chamber in fluid communication with the opening;

a tube extending from the cap into the opening and chamber of the main body, wherein a first end of the tube is disposed inside the chamber of the main body and a second end of the tube is connected to the cap, and wherein the first end of the tube is open and the second end of the tube is closed;

the cap further comprises: at least one inlet hole formed in the conical surface, wherein the at least one inlet hole extends through the cap to fluidically communicate with the opening of the main body;

the at least one inlet hole extends through the cap orthogonal to the center axis;

the main body further comprises: an intermediate wall disposed between the chamber and the second end of the main body; a column extending from the intermediate wall into the chamber and into the tube of the cap, wherein the column terminates between the first end of the tube and the second end of the tube; an exit passage extending through the column and the intermediate wall; and/or at least one flow passage formed between the tube of the cap and the column of the main body, wherein the at least one flow passage fluidically connects the exit passage with the chamber.

In another embodiment, a piston includes a main body extending between a first end and a second end along a center axis of the piston. The main body further includes a chamber formed within the main body, the chamber having an opening disposed at the first end of the main body. The piston further includes a cap that is coaxial with the main body. A portion of the cap extends into the opening of the chamber of the main body. The cap includes a radially outward extending lip, and the main body comprises a groove. A retaining ring is both disposed partially in the groove of the main body and in contact with the radially outward extending lip so as to connect the cap to the main body.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while FIGS. 1 and 2 show main body 12 tapering radially inward from rim 28 to intermediate wall 34, main body 12 can include a cylindrical geometry from rim 28 to intermediate wall 34. In addition, many modifications may be made to adapt a particular situation or material to the teachings of the invention without departing from the essential scope thereof. For example, piston 10 can be used in other valve assemblies apart from bypass valves, such as temperature control valves in aircraft environmental control systems. Therefore, it is intended that the invention not be limited to the particular embodiment(s) disclosed, but that the invention will include all embodiments falling within the scope of the appended claims.

The invention claimed is:

1. A piston comprising:
   a main body extending between a first end and a second end along a center axis of the piston, wherein the main body further comprises:
      a chamber formed within the main body, the chamber comprising an opening disposed at the first end of the main body;
   a cap, wherein the cap is coaxial with the main body and wherein a portion of the cap extends into the opening of the chamber of the main body;
   wherein at least one of the main body and the cap comprises a radially extending lip, and wherein the other of the main body and the cap comprises a groove;
   a retaining ring both disposed partially in the groove and in contact with the radially extending lip so as to connect the cap to the main body;
   a seal disposed between the cap and the main body, wherein the seal is configured to be compressed between the cap and the main body such that the seal exerts a load against the cap and the main body; and
   wherein the retaining ring is on one side of the radially extending lip and the seal is separated from the retaining ring on the other side of the lip.

2. The piston of claim 1, wherein the radially extending lip extends radially inward from the main body toward the cap and wherein the main body further comprises:
   a radially inward facing surface disposed around the opening, wherein the radially inward facing surface extends from the first end of the main body to the radially extending lip,
   wherein at least a portion of the radially inward facing surface is angled such that the radially inward facing surface tapers radially inward as the radially inward facing surface extends from the first end to the radially extending lip.

3. The piston of claim 2, wherein the cap further comprises:
   a radially outward facing surface that is smaller in diameter than the radially inward facing surface of the main body;
   a stop surface extending radially outward from the radially outward facing surface of the cap, wherein the stop surface is larger in diameter than the radially inward facing surface of the main body; and
   the groove is formed in the radially outward facing surface,
   wherein the radially outward facing surface of the cap is positioned opposite the radially inward facing surface of the main body, and wherein the stop surface is disposed proximate the first end of the main body, and
   wherein the retaining ring is disposed partially in the groove of the cap and in contact with the radially extending lip of the main body.

4. The piston of claim 3, wherein the retaining ring includes a circumferential gap forming a first end and a second end in the retaining ring, wherein the circumferential gap is of adequate size such that when the first and second ends of the retaining ring touch one another, the retaining ring is able to freely pass through the opening in the first end of the main body of the piston.

5. A piston comprising:
   a main body extending between a first end and a second end along a center axis of the piston, wherein the main body further comprises:
      an opening disposed at the first end of the main body; and
      a radially inward facing surface disposed around the opening, wherein the radially inward facing surface extends from the first end of the main body to a lip that extends radially outward from radially inward facing surface of the main body,
      wherein at least a portion of the radially inward facing surface is angled such that the radially inward facing surface tapers radially inward as the radially inward facing surface extends from the first end to the lip;
   a cap, wherein the cap is coaxial with the main body and comprises:
      a radially outward facing surface that is smaller in diameter than the radially inward facing surface of the main body;
      a stop surface extending radially outward from the radially outward facing surface of the cap, wherein the stop surface is larger in diameter than the radially inward facing surface of the main body; and a groove formed in the radially outward facing surface, wherein the radially outward facing surface of the cap is positioned opposite the radially inward facing surface of the main body, and wherein the stop surface is disposed proximate the first end of the main body;

a retaining ring disposed partially in the groove of the cap and in contact with the lip of the main body;

a seal disposed on the radially outward facing surface of the cap and in contact with the radially inward facing surface of the main body and the stop surface of the cap, wherein the seal is configured to be compressed between the cap and main body such that the seal exerts a load against the cap and the main body;

wherein the retaining ring is on one side of the radially extending lip and the seal is separated from the retaining ring on the other side of the lip.

6. The piston of claim 5, wherein the cap covers the opening of the main body.

7. The piston of claim 6, wherein the cap further comprises:

a conical surface that extends axially from the stop surface in an axial direction opposite the radially outward facing surface of the cap, and wherein the conical surface tapers radially inward as the conical surface extends axially away from the stop surface.

8. The piston of claim 7, wherein the main body further comprises:

a chamber in fluid communication with the opening.

9. The piston of claim 8, further comprising:

a tube extending from the cap into the opening and chamber of the main body, wherein a first end of the tube is disposed inside the chamber of the main body and a second end of the tube is connected to the cap, and wherein the first end of the tube is open and the second end of the tube is closed.

10. The piston of claim 9, wherein the cap further comprises:

at least one inlet hole formed in the conical surface, wherein the at least one inlet hole extends through the cap to fluidically communicate with the opening of the main body.

11. The piston of claim 10, wherein the at least one inlet hole extends through the cap orthogonal to the center axis.

12. The piston of claim 10, wherein the main body further comprises:

an intermediate wall disposed between the chamber and the second end of the main body;

a column extending from the intermediate wall into the chamber and into the tube of the cap, wherein the column terminates between the first end of the tube and the second end of the tube;

an exit passage extending through the column and the intermediate wall.

13. The piston of claim 12 further comprising:

at least one flow passage formed between the tube of the cap and the column of the main body, wherein the at least one flow passage fluidically connects the exit passage with the chamber.

14. A piston comprising:

a main body extending between a first end and a second end along a center axis of the piston, wherein the main body further comprises:

a chamber formed within the main body, the chamber comprising an opening disposed at the first end of the main body;

a cap, wherein the cap is coaxial with the main body and wherein a portion of the cap extends into the opening of the chamber of the main body;

wherein the cap comprises a radially outward extending lip, and the main body comprises a groove;

a retaining ring both disposed partially in the groove of the main body and in contact with the radially outward extending lip so as to connect the cap to the main body;

a seal disposed between the cap and the main body, wherein the seal is configured to be compressed between the cap and the main body such that the seal exerts a load against the cap and the main body; and wherein the retaining ring is on one side of the radially extending lip and the seal is separated from the retaining ring on the other side of the lip.

* * * * *